US012750236B2

(12) United States Patent
Giannattasio

(10) Patent No.: US 12,750,236 B2
(45) Date of Patent: Sep. 29, 2026

(54) IMPLEMENTING CRYPTOGRAPHICALLY PROTECTED SESSIONS IN DISTRIBUTED COMPUTING SYSTEM

(71) Applicant: Google LLC, Mountain View, CA (US)

(72) Inventor: Gabriel Reitz Giannattasio, Pahrump, NV (US)

(73) Assignee: Google LLC, Mountain View, CA (US)

( * ) Notice: Subject to any disclaimer, the term of this patent is extended or adjusted under 35 U.S.C. 154(b) by 179 days.

(21) Appl. No.: 18/630,966

(22) Filed: Apr. 9, 2024

(65) Prior Publication Data

US 2025/0317303 A1 Oct. 9, 2025

(51) Int. Cl.

*H04L 9/32* (2006.01)
*H04L 9/08* (2006.01)
*H04L 9/40* (2022.01)

(52) U.S. Cl.

CPC .......... *H04L 9/3247* (2013.01); *H04L 9/0877* (2013.01); *H04L 63/068* (2013.01); *H04L 63/126* (2013.01)

(58) Field of Classification Search

CPC ... H04L 9/3247; H04L 9/0877; H04L 63/126; H04L 63/068

See application file for complete search history.

(56) References Cited

U.S. PATENT DOCUMENTS 10,171,463 B1 * 1/2019 Wiger .................. H04L 63/126
2005/0120203 A1 * 6/2005 Yeh .................... H04L 63/0823 380/277
2007/0230358 A1 * 10/2007 Narayanan ............ H04L 67/142 370/244
2007/0299928 A1 12/2007 Kohli et al.
2015/0222603 A1 8/2015 Uzun (Continued)

FOREIGN PATENT DOCUMENTS

CN 112968971 A 6/2021
EP 1654852 B1 4/2008
EP 3915026 B1 12/2022

OTHER PUBLICATIONS

International Search Report and Written Opinion for International Application No. PCT/US2025/021390, mailed May 15, 2025, 15 Pages.

(Continued)

*Primary Examiner* — David J Pearson

(74) *Attorney, Agent, or Firm* — Lowenstein Sandler LLP

(57) ABSTRACT

Methods and systems for implementing cryptographically protected sessions in distributed computing systems are described herein. A server receives, from a client, a first request including a first payload and a first cryptographic signature of the first payload. The server attempts to validate the first cryptographic signature by using a stored public key associated with the client. Responsive to failing to validate the first cryptographic signature, the server transmits an invalid session response to the client. The server then receives, from the client, a second request including a second payload and a second cryptographic signature of the second payload. The second payload includes a new public key associated with the client. Responsive to validating the second cryptographic signature by using the new public key, the server establishes a new session associated with the client.

20 Claims, 7 Drawing Sheets

(56) References Cited

U.S. PATENT DOCUMENTS

| | | | | |
|---|---|---|---|---|
| 2016/0082352 | A1* | 3/2016 | Oku | A63F 13/35 463/29 |
| 2018/0234237 | A1* | 8/2018 | Ye | H04L 9/14 |
| 2019/0312733 | A1 | 10/2019 | Engan et al. | |
| 2020/0036703 | A1 | 1/2020 | Hakansson | |
| 2020/0322151 | A1 | 10/2020 | Latimer | |
| 2021/0288794 | A1* | 9/2021 | O'Neill | H04L 9/3247 |
| 2021/0385247 | A1* | 12/2021 | Faisal | H04L 9/0631 |
| 2022/0247579 | A1 | 8/2022 | Bester et al. | |

OTHER PUBLICATIONS

Biraj, Paul, School of Science, Thesis submitted for examination for the degree of Master of Science in Technology, "Authentication and authorization for the front-end web developer", https://aaltodoc.aalto.fi/bitstream/handle/123456789/46115/master_Paul_Biraj_2020.pdf?sequence=1&isAllowed=y, 61 pages, Jun. 22, 2020.

Sauber, Andrew J., Drexel University, "Session Armor: Protection against session hijacking using per-request authentication", https://core.ac.uk/pdf/aaa190333356.pdf, 151 pages, Sep. 2017.

* cited by examiner

IMPLEMENTING CRYPTOGRAPHICALLY PROTECTED SESSIONS IN DISTRIBUTED COMPUTING SYSTEM

TECHNICAL FIELD

Aspects and implementations of the present disclosure relate to implementing cryptographically protected sessions in distributed computing systems.

BACKGROUND

In a distributed computing system, a browser-based client can access one or more applications available via a HyperText Transfer Protocol (HTTP) server. The applications can be running on the HTTP server itself and/or on one or more application servers, for which the HTTP server can act as the presentation layer, by forwarding client requests to the application servers and forwarding application server responses back to the client browser.

While some applications accessible via an HTTP server can be stateful (i.e., maintaining their initial state in course of a session with a client), the HTTP protocol itself is stateless and thus does not provide session support. "Session" refers to a sequence of requests and responses between a client and a server; such a sequence can be initiated by authenticating the client and can be terminated by either side.

SUMMARY

The below text represents a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented herein below.

In some implementations, a method for implementing cryptographically protected sessions in distributed computing systems includes receiving, by a server, a first request originated by a client. The first request includes a first payload and a first cryptographic signature of the first payload. The method further includes attempting to validate, using a stored public key associated with the client, the first cryptographic signature. The method further includes, responsive to failing to validate the first cryptographic signature, transmitting, to the client, an invalid session response. The method further includes receiving, from the client, a second request including a second payload and a second cryptographic signature of the second payload. The second payload includes a new public key associated with the client. The method further includes validating, using the new public key, the second cryptographic signature. The method further includes, responsive to validating the second cryptographic signature, establishing a new session associated with the client.

In some implementations, the second cryptographic signature includes at least one of a third cryptographic signature determined using an in-memory private key of the client and a fourth cryptographic signature determined using a trusted platform module (TPM)-generated private key of the client.

In some implementations, the method further includes responsive to establishing the new session associated with the client, forwarding the second payload and an identifier of the new session to a backend application.

In some implementations, the method further includes transmitting, to the client, an application response including the data received from the backend application.

In some implementations, the second payload further includes at least one of (i) a cryptographic digest of an executable script executed by the client in order to apply a predefined transformation to a value of a session state variable and (ii) an updated value of the session state variable.

In some implementations, the method further includes attempting to validate the updated value of the session state variable; and, responsive to failing to validate the updated value of the session state variable, transmitting, to the client, a second invalid session response.

In some implementations, the invalid session response includes at least one of a session handshake header, a session signature header, a session metadata header, or a session information header.

In some implementations, a system includes a memory and a processing device. The processing device is to perform operations including receiving a first request originated by a client. The first request includes a first payload and a first cryptographic signature of the first payload. The operations further include attempting to validate, using a stored public key associated with the client, the first cryptographic signature. The operations further include, responsive to failing to validate the first cryptographic signature, transmitting, to the client, an invalid session response. The operations further include receiving, from the client, a second request including a second payload and a second cryptographic signature of the second payload. The second payload includes a new public key associated with the client. The operations further include validating, using the new public key, the second cryptographic signature. The operations further include, responsive to validating the second cryptographic signature, establishing a new session associated with the client.

In some implementations, the second cryptographic signature includes at least one of a third cryptographic signature determined using an in-memory private key of the client or a fourth cryptographic signature determined using a trusted platform module (TPM)-generated private key of the client.

In some implementations, the operations further include, responsive to establishing the new session associated with the client, forwarding the second payload and an identifier of the new session to a backend application.

In some implementations, the second payload further includes at least one of (i) a cryptographic digest of an executable script executed by the client in order to apply a predefined transformation to a value of a session state variable or (ii) an updated value of the session state variable.

In some implementations, the invalid session response includes an executable script to be executed by the client.

In some implementations, the invalid session response includes at least one of a session handshake header, a session signature header, a session metadata header, or a session information header.

In some implementations, a non-transitory computer-readable storage medium stores executable instructions that, when executed by a processing device, cause the processing device to perform operations including receiving a first request originated by a client. The first request includes a first payload and a first cryptographic signature of the first payload. The operations further include attempting to validate, using a stored public key associated with the client, the first cryptographic signature. The operations further include, responsive to failing to validate the first cryptographic signature, transmitting, to the client, an invalid session response. The operations further include receiving, from the client, a second request including a second payload and a second cryptographic signature of the second payload. The second payload includes a new public key associated with the client. The operations further include validating, using the new public key, the second cryptographic signature. The operations further include, responsive to validating the second cryptographic signature, establishing a new session associated with the client.

In some implementations, the second cryptographic signature includes at least one of a third cryptographic signature determined using an in-memory private key of the client or a fourth cryptographic signature determined using a trusted platform module (TPM)-generated private key of the client.

In some implementations, the operations further include, responsive to establishing the new session associated with the client, forwarding the second payload and an identifier of the new session to a backend application.

In some implementations, the second payload further includes at least one of (i) a cryptographic digest of an executable script executed by the client in order to apply a predefined transformation to a value of a session state variable or (ii) an updated value of the session state variable.

In some implementations, the invalid session response includes an executable script to be executed by the client.

In some implementations, the invalid session response includes at least one of a session handshake header, a session signature header, a session metadata header, or a session information header.

BRIEF DESCRIPTION OF DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
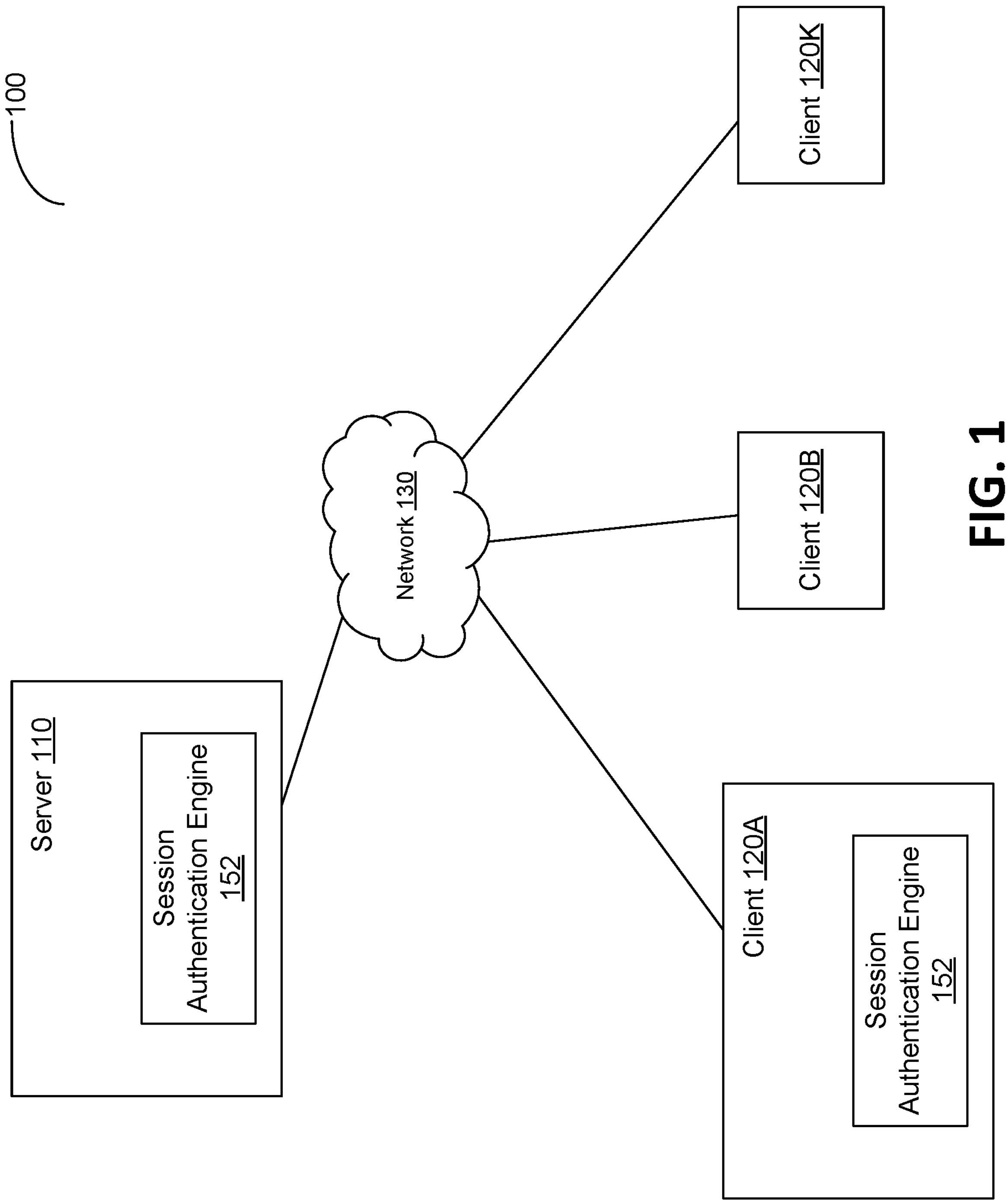
FIG. 1 illustrates an example distributed computing system operating in accordance with aspects of the present disclosure.

Aspects of the present disclosure relate to implementing cryptographically protected sessions in distributed computing systems. In a distributed computing system, a browser-based client can access one or more applications available via a HyperText Transfer Protocol (HTTP) server. The applications can be running on the HTTP server itself and/or on one or more application servers, for which the HTTP server can act as the presentation layer, by forwarding client requests to the application servers and forwarding application server responses back to the client browser.

While some applications accessible via an HTTP server can be stateful (i.e., maintaining their initial state in course of a session with a client), the HTTP protocol itself is stateless and thus does not provide session support. "Session" refers to a sequence of requests and responses between a client and a server; such a sequence can be initiated by authenticating the client and can be terminated by either side.

Some conventional systems utilize HTTP cookies for carrying session identifiers and various related information. An HTTP cookie is a named alphanumeric string which, once generated by an HTTP server and returned to an HTTP client as part of an HTTP response message, should be included by the client in all subsequent HTTP request messages directed to HTTP servers in a specified Domain Naming System (DNS) domain, until the cookie expires or is reset or overwritten by an HTTP server. However, various cookie-based implementations exhibit vulnerabilities that have been exploited by attackers, e.g., in order to hijack cookie-based sessions.

Implementations of the present disclosure address the above and other deficiencies by implementing cryptographically protected sessions in distributed computing systems. In an illustrative example, a client can transmit, to a server, a request including a payload and one or more headers which can carry a cryptographic signature of the payload and session metadata. Upon successfully validating the cryptographic signature, the server can forward the payload of the request to one or more backend applications running on application servers. The responses generated by the backend applications can be forwarded by the server back to the client.

Conversely, upon failing to successfully validate the cryptographic signature, the server can transmit an invalid session response, thus causing the client to initiate a new session. Upon generating a new cryptographic key pair and performing a user authentication procedure, the client can transmit to the server a new request including the public key of the newly generated keypair and the payload signed by the private key of the newly generated keypair. Upon validating the cryptographic signature of the request, the server can store the new public key, to be used for validating the subsequent requests initiated by the client. The subsequent requests and responses can flow between the client and the server until the session is invalidated by the server, as described in more detail herein below.

Accordingly, aspects of the present disclosure enable the developer to define rules for the session authentication scheme to be implemented, which is based on cryptographically signing all requests and responses flowing between the client and the server. As described below, implementations of the present disclosure reduce the access from the browser to the data being transported for authenticating requests and responses as belonging to a session, while removing access from the browser-based scripts and extensions to the session authentication process. The performance and security considerations are effectively balanced by employing Trusted Platform Module (TPM)-based and in-memory cryptographic keys. The security is further hardened by disallowing any application programming interface (API) level access to private keys or to the request signatures; the session data is write-only in the API level access.

Various aspects of the methods and systems are described herein by way of examples, rather than by way of limitation. The systems and methods described herein can be implemented by hardware (e.g., general purpose and/or specialized processing devices, and/or other devices and associated circuitry), software (e.g., instructions executable by a processing device), or a combination thereof.

FIG. 1 illustrates an example distributed computing system 100 operating in accordance with aspects of the present disclosure. As shown in FIG. 1, the server 110 can accept requests and transmit responses from/to one or more clients 120A-120K, which can be connected to the server 110 via a network 130 represented by one or more public (e.g., the Internet) or private networks. In some implementations, the system 100 can further include one or more application servers 140A-140L running one or more backend applications accessible via the server 100. As illustrated in FIG. 1, various components of the distributed computing system, including the server 110 and each of the clients 120A-120K can include a session authentication engine 152, which can be employed to implement cryptographically protected sessions, in accordance with implementations described herein.

The "servers" and "clients" depicted by FIG. 1 are functional designations of the respective components of system 100. Each of the components can be implemented by a suitable physical computer system (e.g., a physical server, a personal computer, a mobile communication device, etc.) or by a virtual machine running on a hardware platform which can be shared with other virtual machines. In some implementations, one or more components of system 100 can be implemented in a cloud-based computing environment. Routers, firewalls, load-balancers, and other auxiliary networking components are omitted from FIG. 1 for clarity and conciseness.

In operation, the client 120A and the server 110 can store each other's public keys. The client 120A can utilize the server's public key to validate the server's responses, while the server 110 uses the client's public key to validate the requests and associate the requests with a session.

In an illustrative example, a client 120A can transmit a request to the server 110. The request can include the payload (e.g., a GET request specifying a unified resource identifier (URI) of the requested file) and one or more headers. In some implementations, the headers can carry a cryptographic signature of the payload and session metadata. Upon successfully validating the cryptographic signature, the server 110 can forward the payload of the request to one or more backend applications running on application servers 140A-140L. The responses generated by the backend applications can be forwarded by the server 110 back to the client 120A.

Conversely, upon failing to successfully validate the cryptographic signature, the server 110 can transmit, to the client 120A, an invalid session response, thus causing the client 120A to initiate a new session. Upon receiving the invalid session response, the client 120A can generate a new cryptographic key pair including a private key and a public key. The client 120A can further perform a user authentication procedure. The client 120A can transmit, to the server, a new request, which can include the public key of the newly generated keypair and the payload signed by the private key of the newly generated keypair.

Upon validating the cryptographic signature of the request, the server 110 can store the new public key for the client 120A, to be used for validating the subsequent requests initiated by the client 120A. The server 110 can then transmit, to the client 120A, a response, the payload of which can include an HTTP response (e.g., the contents of the requested file) responsive to the HTTP request transmitted by the client.

The subsequent requests and responses can use the session signature header and the session metadata header until the session is invalidated by the server. The server can invalidate the session upon detecting a triggering condition, as described in more detail herein below.

In various implementations of the disclosure, a "user" can be represented by a single individual. However, other implementations of the disclosure encompass a "user" being an entity controlled by a group of individuals and/or an automated source. For example, a group of individuals federated as a community in a social network can be considered a "user." Further to the descriptions above, a user can be provided with controls allowing the user to make an election as to both if and when systems, programs, or features described can enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

Figure 2:
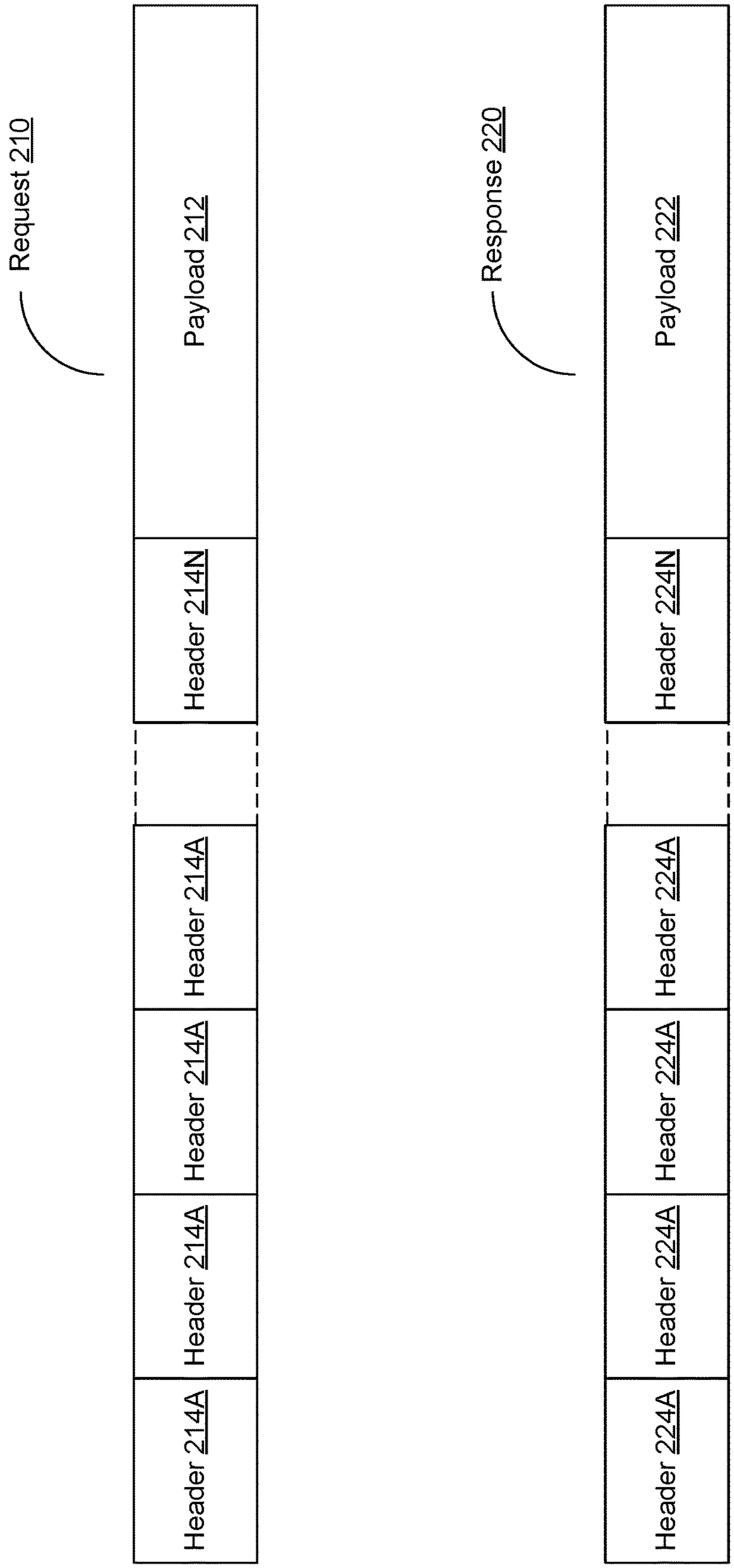
FIG. 2 schematically illustrates the structure of requests and responses flowing between a client and a server operating in accordance with aspects of the present disclosure.

FIG. 2 schematically illustrates the structure of requests and responses flowing between a client (e.g., the client 120A of FIG. 1) and a server (e.g., the server 110 of FIG. 1) operating in accordance with aspects of the present disclosure. As schematically illustrated by FIG. 2, a request 210 can include a payload 212 and one or more headers 214A-214N. In some implementations, the session signature header 214A can be utilized by the server 110 for carrying the session signature (e.g., the cryptographic signature of the payload); the session handshake header 214B can be utilized for the session handshake and can carry the client's public key, which can be utilized for verifying the session signature; the session information header 214C can be utilized for carrying the list of cryptographic digest computation protocols supported by the client for generating the cryptographic signature (e.g., ECDSA, SHA-256); the session metadata header 214D can be utilized for carrying the session metadata, as explained in more detail below. In some implementations, the request 210 can include various other headers 214K-214N.

In some implementations, the session signature header 214A can be utilized by all requests transmitted by the client 120A. The session handshake header 214B can be utilized in establishing a new session with the server 110, and can be omitted from subsequent requests while the session is active. Other headers 214C-214N can be utilized with at least some requests transmitted by the client 120A.

In an illustrative example, the client 120A can employ an HTTP browser for generating requests to and processing responses from the server 110. In browser-based implementations, all the headers except for the session metadata header can not be accessible by the executable code (e.g., Javascript) running within the browser, thus protecting the session from various attacks exploiting the browser's vulnerabilities. Conversely, the session metadata header can be utilized for transmitting, to the server 110, arbitrary textual strings, which can be utilized for carrying the values of one or more session state variables and/or implementing application-specific logic, as explained in more detail below.

As further schematically illustrated by FIG. 2, a response 220 can include a payload 222 and one or more headers 224A-224N. In some implementations, the header 224A can be utilized for carrying the session signature (e.g., the cryptographic signature of the payload of the response); the header 224B can be utilized for the session handshake and can carry the server's public key, which can be utilized by the client 120A for verifying the session signature; the header 224C can be utilized for carrying the list of cryptographic digest computation protocols supported by the server for generating the cryptographic signature (e.g., ECDSA, SHA-256); the header 224D can be utilized for carrying the session metadata, as explained in more detail below. In some implementations, the response 220 can include various other headers 224K-224N.

In some implementations, the session signature header 224A can be utilized by all requests transmitted by the server 120A. The session handshake header 224B can be utilized in requesting the client 120A to generate a new key pair and establish a new session; the session handshake header 224B can be omitted from one or more subsequent responses. Other headers 224C-224N can be utilized with at least some responses transmitted by the server 110, as explained in more detail below.

Figure 3:
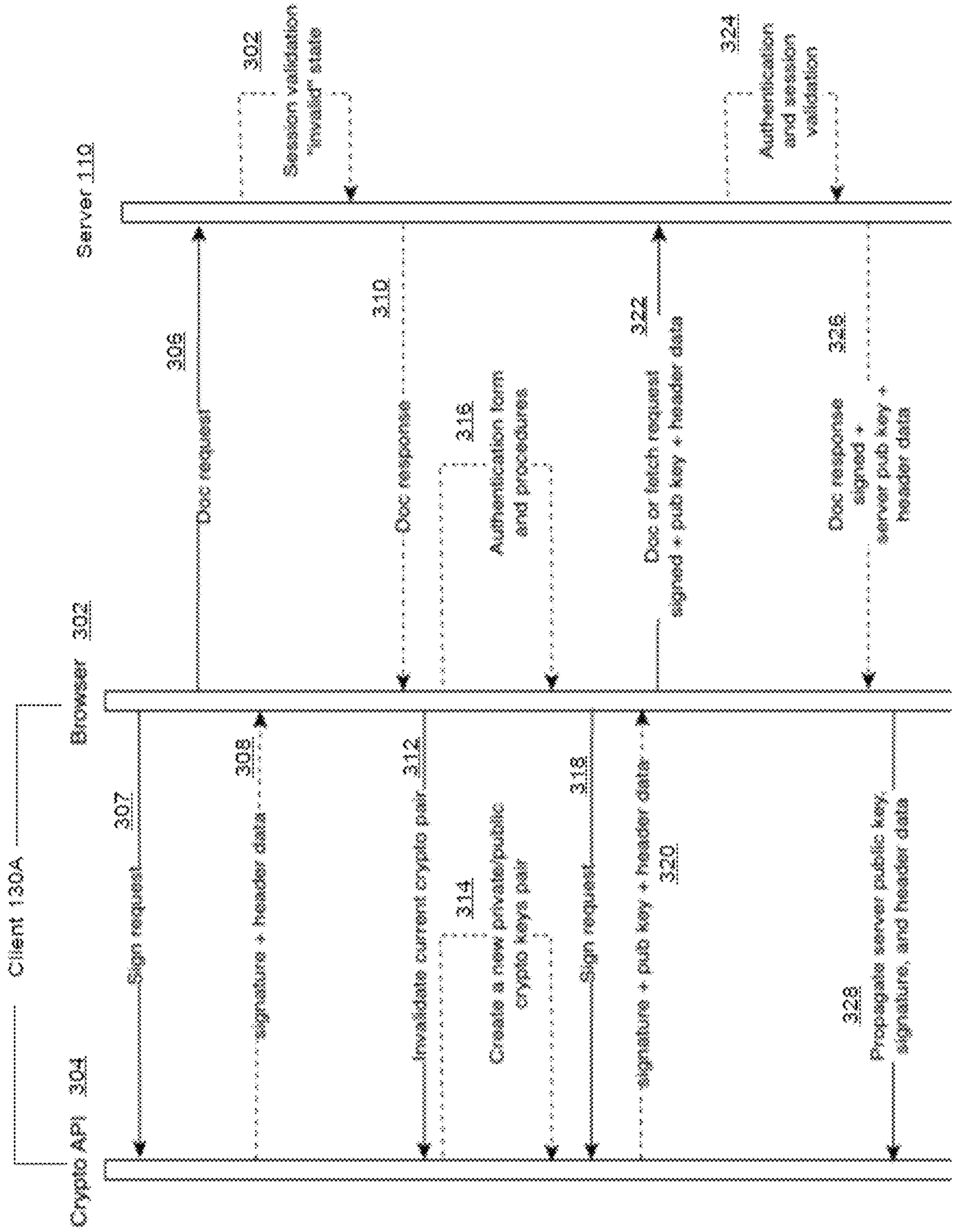
FIG. 3 schematically illustrates an interaction diagram showing communications between a client and a server operating in accordance with aspects of the present disclosure.

FIG. 3 schematically illustrates an interaction diagram showing communications between a client (e.g., the client 120A of FIG. 1) and a server (e.g., the server 110 of FIG. 1) operating in accordance with aspects of the present disclosure. As shown in FIG. 3, the client 120A can include a browser 302 and a cryptographic module 304. The cryptographic module 304 can be implemented by one or more software modules running on a central processing unit (CPU) of the client 120A and/or by a Trusted Program Module (TPM) of the client 120A. The TPM can include a hardware random number generator, a hardware logic (e.g., an application-specific integrated circuit (ASIC)) for generating cryptographic key pairs based on the random numbers generated by the hardware number generator, and a sealed storage for the generated cryptographic key pairs. In some implementations, the TPM can be employed for performing remote attestation of the client 120A, which involves creating a cryptographic digest of the hardware and software configuration of the client 120A that can be utilized as a proof that the client configuration has not been tampered with. In some implementations, the TPM can have a storage root key, which can be utilized for protecting the cryptographic keys stored in the local memory of the client 120A. In some implementations, the cryptographic module can be accessible via a cryptographic application programming interface (API).

As shown in FIG. 3, the browser 302 can generate the payload of the request 306 to be transmitted to the server 110. In some implementations, the payload of the request 306 can include an HTTP request (e.g., a GET request specifying a unified resource identifier (URI) of the requested file). Alternatively, the payload of the request 306 can be compliant with another suitable representational state transfer (REST) protocol or another request-response protocol.

Upon generating the payload of the request 306, the browser 302 can send a signature request 307 to the cryptographic module 304 to sign the payload of the request 306. The cryptographic module 304 can respond with the cryptographic signature 308 and the header data to be included into the request 306. In some implementations, the cryptographic signature 308 can be represented by an encrypted value of a cryptographic digest generated by a chosen cryptographic digest transformation (e.g., ECDSA, SHA-256) of the payload of the request 306. The cryptographic digest value can be encrypted with a private key of the client 120A. In some implementations, an identifier of the chosen cryptographic digest computation protocol can be communicated to the server by a dedicated request header (e.g., the session information header 214C of FIG. 2).

Referring again to FIG. 3, the browser 302 can then send the request 306 including the payload and one or more headers to the server 110. In an illustrative example, the request 306 can include a session signature header carrying the cryptographic signature 308. In some implementations, the request 306 can further include a session metadata header, which can be utilized, e.g., for transmitting to the server the values of one or more session state variables, as described in more detail herein below.

The server 110 can validate (operation 309) the cryptographic signature of the request 306 by decrypting the cryptographic signature using the stored public key of the client 120A. The decrypted value can then be compared to a computed value of the cryptographic digest of the payload of the request 306. In some implementations, should the two values of the digest match, the server 110 can perform additional validation operations to validate the session, e.g., using the values of one or more session state variables that can be carried by the session metadata header, as described in more detail herein below.

Upon failing to successfully validate the session (e.g., due to detecting a mismatch of the received and computed values of the cryptographic digest of the payload of request 306 or due to failing additional session validation operations), the server 110 can transmit, to the client 120A, an invalid session response 310. In some implementations, the invalid session response 310 can include a session handshake header, thus causing the client 120A to initiate a new session. In some implementations, the invalid session response 310 can include additional information with respect to the failed attempt to validate the session (e.g., the error code and/or a textual description of the error).

Upon receiving the invalid session response 310, the browser 302 can transmit, to the cryptographic module 304, a request 312 to invalidate the current cryptographic key pair (including the public and private keys). Responsive to receiving the key pair invalidation request 312, the cryptographic module 304 can invalidate the current cryptographic key pair of the browser 302 and then can generate (operation 314) a new cryptographic key pair to be associated with the browser 302, including a private key and a public key. In an illustrative example, the new cryptographic key pair can be generated by a CPU of the client 120A and can be stored in the main memory of the client 120. In another illustrative example, the new cryptographic key pair can be generated and stored by a TPM of the client 120A. In another illustrative example, the cryptographic module 304 can generate both in-memory and TPM-based cryptographic key pairs, and can use the TPM-generated private key to cryptographically sign the in-memory public key to be send to the server 110.

The browser 302 can further perform the authentication procedure 316 to authenticate the user of the browser 302. In an illustrative example, the authentication procedure can involve transmitting the user's credentials (e.g., the username and password pair) to an authentication server, which may, upon successfully authenticating the user, issue an access token that is cryptographically signed using the private key of the authentication server. The client 120A can then include the authentication token and/or one or more values derived from the authentication token into the session metadata headers of one or more subsequent requests transmitted to the server 110.

Upon successfully performing the authentication procedure 316, the browser 302 can generate the payload of the new request 322 to be transmitted to the server 110. In some implementations, the payload of the request 322 can include the payload of the last unsuccessful request (e.g., request 306).

Upon generating the payload of the request 322, the browser 302 can send a signature request 318 to the cryptographic module 304 to sign the payload of the request 322. The cryptographic module 304 can respond with the cryptographic signature 320, the public key of the keypair that has been generated at operation 314, and the header data to be included into the request 306.

In some implementations, the cryptographic signature 320 can be represented by an encrypted value of a cryptographic digest of the payload of the request 306. The cryptographic digest value can be encrypted with the client's private key corresponding to the public key of the keypair that has been generated at operation 314.

The browser 302 can then send the request 322 including the payload and one or more headers to the server 110. In an illustrative example, the request 306 can include a session signature header carrying the cryptographic signature 308; the request 322 can further include a session handshake header carrying the client's public key, which can be utilized for verifying the session signature; the request 322 can further include a session information header carrying the cryptographic digest computation protocols utilized by the client for generating the cryptographic signature (e.g., ECDSA or SHA-256). In some implementations, the request 322 can further include a session metadata header, which can be utilized, e.g., for transmitting to the server the values of one or more session state variables, as described in more detail herein below.

The server 110 can validate (operation 324) the cryptographic signature of the request 322 by decrypting the cryptographic signature using the new public key extracted from the session handshake header of the request 322. The decrypted signature value can then be compared to a computed value of the cryptographic digest of the payload of the request 322. In some implementations, should the two values of the digest match, the server 110 can perform additional validation operations to validate the session, e.g., using the values of one or more session state variables that can be carried by the session metadata header, as described in more detail herein below.

Upon successfully validating the session, server 110 can store the new public key for the client 120A, to be used for validating the subsequent requests initiated by the client 120A. The server 110 can then transmit, to client 120A, a response 326. In an illustrative example, the payload of response 210 can include an HTTP response (e.g., the contents of the requested file) responsive to the HTTP request transmitted by the request 306. Alternatively, request 306 and response 322 can implement other suitable representational state transfer (REST) protocols or other request-response protocols.

The subsequent requests and responses can use the session signature header and the session metadata header until the session is invalidated by the server. The server can invalidate the session upon detecting a triggering condition (e.g., expiration of a predefined period of time elapsed since the previous session handshake; a different Internet Protocol (IP) address used by the client in a subsequent request as compared to the IP address that was used by the client in the previous requests; payloads of one or more requests matching a certain pattern; etc.).

Figure 4:
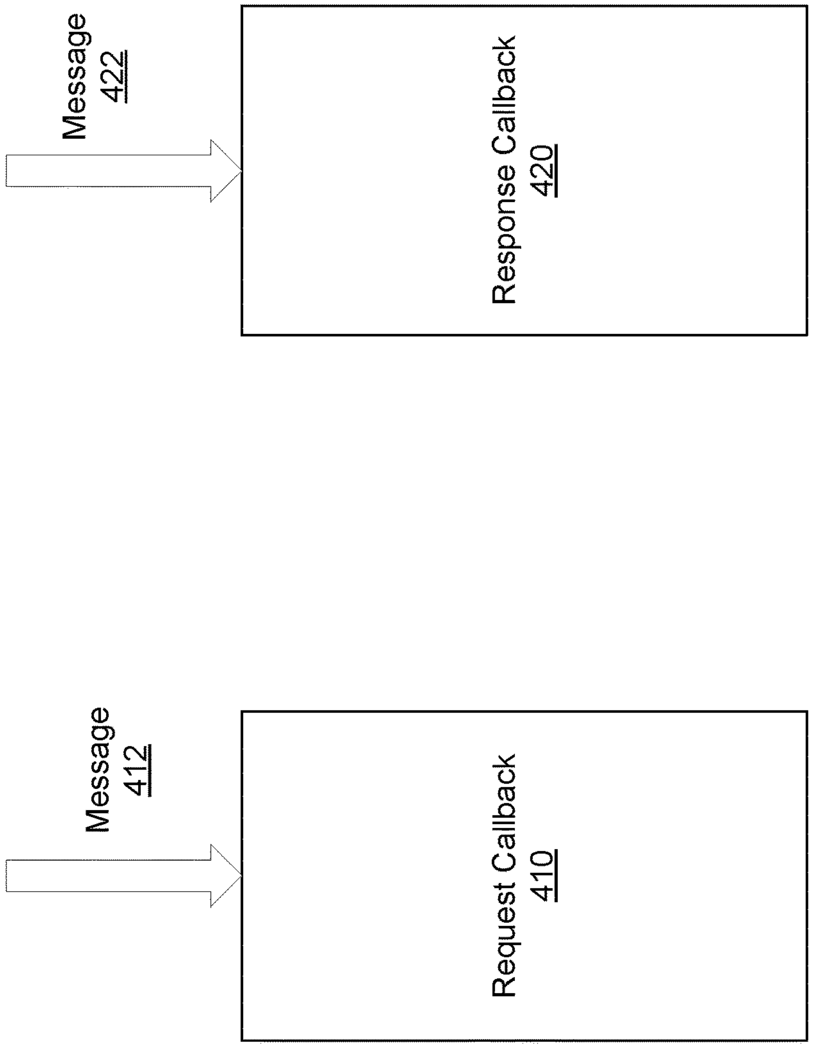
FIG. 4 schematically illustrates an example callback scheme that can be automatically triggered by every request and response flowing between a client and a server operating in accordance with aspects of the present disclosure.

FIG. 4 schematically illustrates an example callback scheme that can be automatically triggered by every request and response flowing between a client and a server operating in accordance with aspects of the present disclosure. As schematically illustrated by FIG. 4, the request callback 410 is an executable script that can be triggered on every request, and the response callback 420 is an executable script that can be triggered on every response. The two callback scripts can be used for secure transporting session metadata between the client and the server. As the two callback scripts are executed in a dedicated execution environment (e.g., a background execution thread created within the browser context), the session metadata is not accessible by any script running outside of the dedicated execution environment. The request callback can accept the request callback message 412 as its input parameter. The response callback can accept the response callback message 422 as its input parameter. The request and response callback messages are transported between the client and the server by the respective session metadata headers (e.g., header 214D of FIG. 2). Thus, the request callback message 412 is inserted into the session metadata header of a request that is transmitted by the client to the server. Conversely, the response callback message 422 is inserted into the session metadata header of a response that is transmitted by the server to the client. In some implementations, the session metadata headers are concatenated with the payload in order to compute respective cryptographic digests serving as the cryptographic signatures of the request or response.

In some implementations, the callback scripts can be sent by the server to the browser (e.g., as part of the session metadata header of a response). The browser can compute a cryptographic digest of a serialized callback script and append the value of the cryptographic digest to the session metadata header of a subsequent request, thus allowing the server to ascertain that the callback script has not been tampered with on the client.

In some implementations, the callback scripts can be employed for implementing additional session validation logic. In an illustrative example, the server can, upon initiating a new session, initialize a session state variable and transmit it to the browser together with a callback script that applies a chosen transformation to the session state variable (e.g., as part of the session metadata header of a response transmitted by the server upon initiating the new session). The client can utilize the callback script as the request callback, thus applying the chosen transformation to the session state variable before transmitting to the server the next request and the transformed value of the session state variable (e.g., as part of the session metadata header of the request). The server can compare the received value of the transformed session variable to the locally computed transformed value of its copy of the session state variable. Upon detecting a mismatch, the server can invalidate the session and transmit, to the client, an invalid session response, thus causing the client to initiate a new session.

Figure 5:
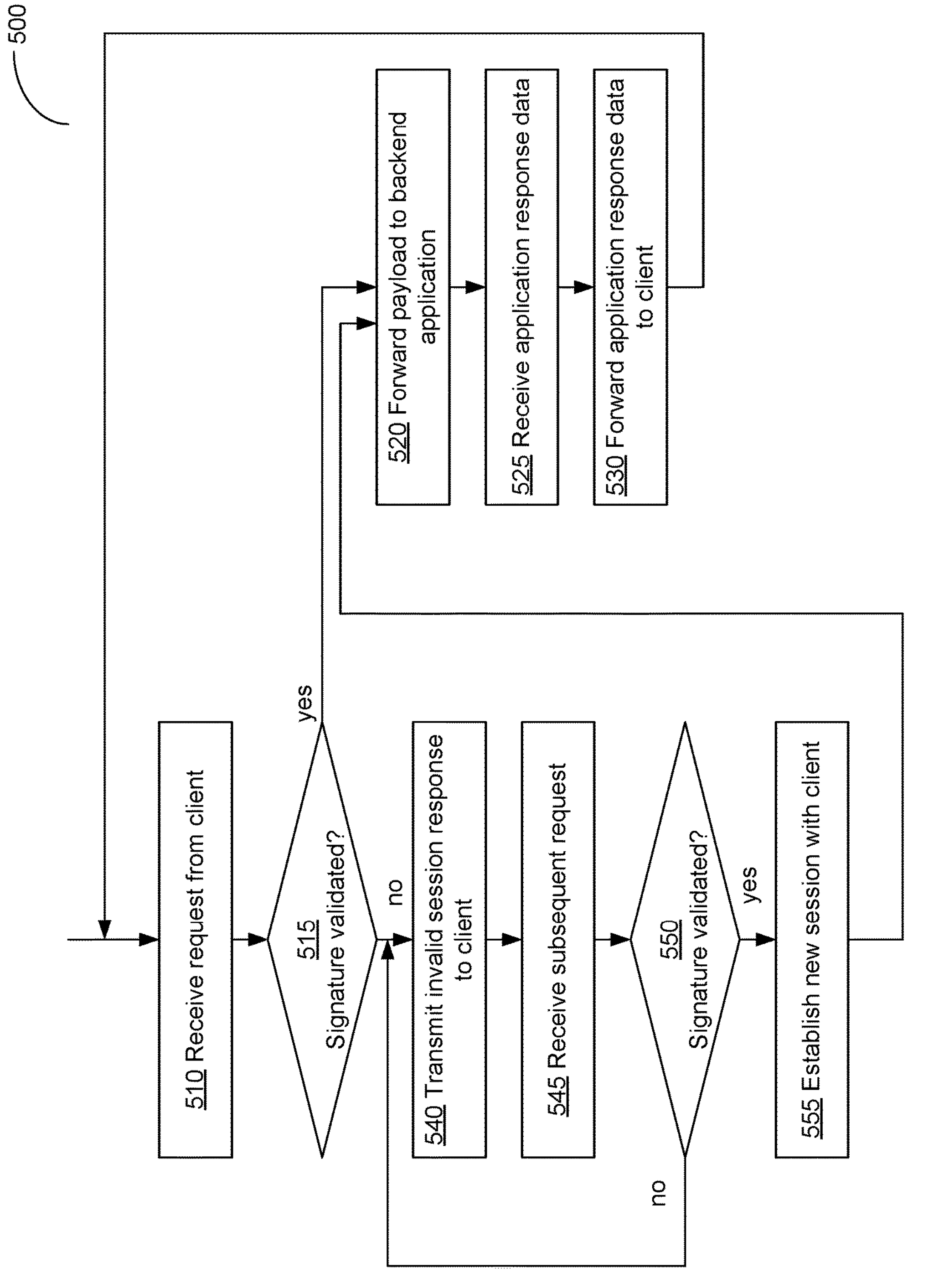
FIG. 5 is a high-level flow diagram of an example method of implementing cryptographically protected sessions by a server operating in accordance with aspects of the present disclosure.

FIG. 5 is a high-level flow diagram of an example method 500 of implementing cryptographically protected sessions by a server operating in accordance with aspects of the present disclosure. The method 500 can be performed by processing logic that can include hardware (e.g., general purpose or specialized processing devices, circuitry, dedicated logic, programmable logic, microcode, integrated circuits, etc.), software (e.g., instructions run or executed on a processing device), or various combinations thereof. In some implementations, method 500 can be performed by a single processing thread. Alternatively, method 500 can be performed by two or more processing threads, each thread executing one or more individual functions, routines, subroutines, or operations of the method. In an illustrative example, the processing threads implementing method 500 can be synchronized (e.g., using semaphores, critical sections, and/or other thread synchronization mechanisms). Alternatively, the processing threads implementing method 500 can be executed asynchronously with respect to each other. Method 500 can be performed by processing logic that can include hardware (circuitry, dedicated logic, etc.), software (e.g., instructions run on a processing device), or a combination thereof. In one implementation, some or all of the operations of method 500 can be performed by one or more components of system 100 of FIG. 1. In some implementations, some or all of the operations of method 500 can be performed by the server 110 and/or security engine 152 of FIG. 1. Operations of method 500 can be specified by a sequence of command codes, which the processing logic can retrieve from a dedicated storage location. Although shown in a particular sequence or order, unless otherwise specified, the order of the operations can be modified. Thus, the illustrated implementations should be understood only as examples, and the illustrated operations can be performed in a different order, and some operations can be performed in parallel. Additionally, one or more operations can be omitted in various implementations. Thus, not all operations are required in every implementation.

At operation 510, the processing logic receives, from a client, a request including a payload and a cryptographic signature of the payload, as described in more detail herein above.

At operation 515, the processing logic attempts to validate the cryptographic signature by using the stored public key associated with the client, as described in more detail herein above.

Responsive to successfully validating, at operation 515, the cryptographic signature, the processing logic, at operation 520, forwards the payload and an identifier of the current session to a backend application specified by the payload, as described in more detail herein above.

At operation 525, the processing logic receives application response data from the backend application, as described in more detail herein above.

At operation 530, the processing logic forwards the application response data to the client, as described in more detail herein above. Upon forwarding the application response data to the client, the method loops back to operation 510.

Responsive to failing to validate, at operation 515, the cryptographic signature, the processing logic, at operation 540, transmits an invalid session response to the client. In some implementations, the invalid session response includes at least one of: a session handshake header, a session signature header, a session metadata header, or a session information header. In some implementations, the invalid session response further includes at least one of: an executable script to be utilized by the client as a request callback script or an executable script to be utilized by the client as a response callback script, as described in more detail herein above.

At operation 545, the processing logic receives, from the client, a subsequent request including a payload and a cryptographic signature of the payload. The payload further includes a new public key of a new key pair generated by the client. In some implementations, the cryptographic signature can include at least one of: a cryptographic signature determined using an in-memory private key of the client or a cryptographic signature determined using a trusted platform module (TPM)-generated private key of the client. In some implementations, the payload further includes at least one of: (i) a cryptographic digest of an executable script executed by the client in order to apply a predefined transformation to a value of a session state variable or (ii) an updated value of the session state variable. In some implementations, upon failing to validate the updated value of the session state variable, the method loops back to operation 540, as described in more detail herein above.

At operation 550, the processing logic attempts to validate the cryptographic signature of the subsequent request by using the new public key, as described in more detail herein above.

Responsive to successfully validating, at operation 550, the cryptographic signature of the subsequent request, the processing logic, at operation 555, establishes a new session associated with the client. In some implementation, the processing logic stores, in a memory (such as a local memory and/or a database residing in a storage memory), the new public key in association with an identifier of the client, thus allowing the new public key to be used for validating future requests originated by the client, as described in more detail herein above.

Upon establishing, at operation 555, the new session associated with the client, the method branches to operation 530, as described in more detail herein above.

Responsive to failing to validate, at operation 550, the cryptographic signature of the subsequent request, the cryptographic signature of the subsequent request, the method branches to operation 540, as described in more detail herein above.

Figure 6:
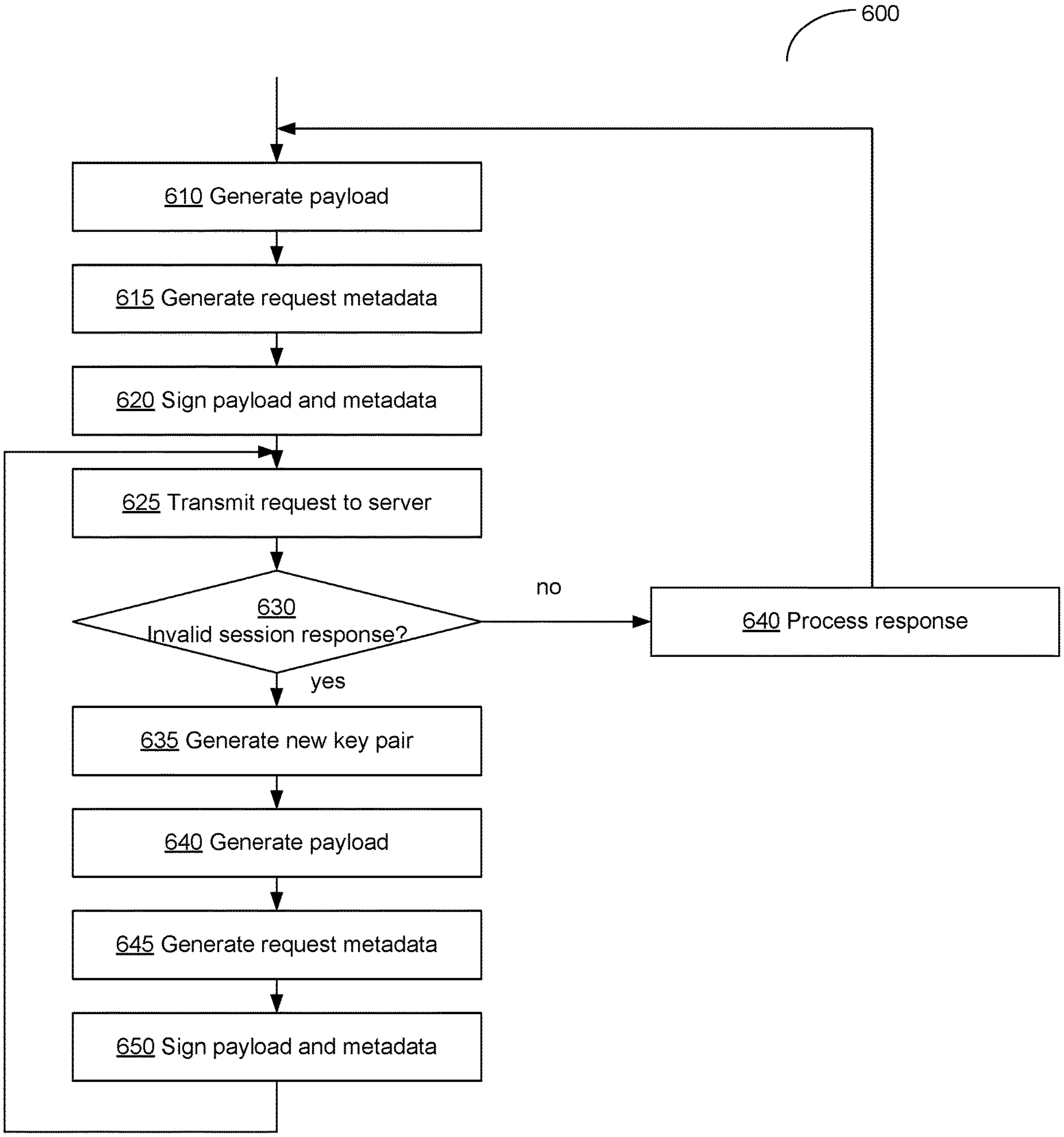
FIG. 6 is a high-level flow diagram of an example method of implementing cryptographically protected sessions by a client operating in accordance with aspects of the present disclosure.

FIG. 6 is a high-level flow diagram of an example method 600 of implementing cryptographically protected sessions by a client operating in accordance with aspects of the present disclosure. The method 600 can be performed by processing logic that can include hardware (e.g., general purpose or specialized processing devices, circuitry, dedicated logic, programmable logic, microcode, integrated circuits, etc.), software (e.g., instructions run or executed on a processing device), or various combinations thereof. In some implementations, method 600 can be performed by a single processing thread. Alternatively, method 600 can be performed by two or more processing threads, each thread executing one or more individual functions, routines, subroutines, or operations of the method. In an illustrative example, the processing threads implementing method 600 can be synchronized (e.g., using semaphores, critical sections, and/or other thread synchronization mechanisms). Alternatively, the processing threads implementing method 600 can be executed asynchronously with respect to each other. Method 600 can be performed by processing logic that can include hardware (circuitry, dedicated logic, etc.), software (e.g., instructions run on a processing device), or a combination thereof. In one implementation, some or all of the operations of method 600 can be performed by one or more components of system 100 of FIG. 1. In some implementations, some or all of the operations of method 600 can be performed by the client 120A and/or security engine 162 of FIG. 1. Operations of method 600 can be specified by a sequence of command codes, which the processing logic can retrieve from a dedicated storage location. Although shown in a particular sequence or order, unless otherwise specified, the order of the operations can be modified. Thus, the illustrated implementations should be understood only as examples, and the illustrated operations can be performed in a different order, and some operations can be performed in parallel. Additionally, one or more operations can be omitted in various implementations. Thus, not all operations are required in every implementation.

At operation 610, the processing logic generates the payload of a request to be sent to a server. In an illustrative example, the payload can include a GET request specifying a unified resource identifier (URI) of a file requested by a user of the client browser, as described in more detail herein above.

At operation 615, the processing logic generates the request metadata. In an illustrative example, the request metadata can include an updated value of a session state variable, as described in more detail herein above.

At operation 620, the processing logic generates a cryptographic signature of the payload and the metadata. In an illustrative example, the cryptographic signature 308 can be represented by an encrypted value of a cryptographic digest generated by a chosen cryptographic digest transformation (e.g., ECDSA, SHA-256) of the payload of the request 306. The cryptographic digest value can be encrypted with a private key of the client 120A. In some implementations, an identifier of the chosen cryptographic digest computation protocol can be communicated to the server by a dedicated request header (e.g., the session information header 214C of FIG. 2), as described in more detail herein above.

At operation 625, the processing logic transmits the request payload, the request metadata, and the cryptographic signature to the server, as described in more detail herein above.

Responsive to receiving, at operation 630, an invalid session response the processing continues at block 635; otherwise, the received response is processed at operation 640.

In an illustrative example, processing the response may involve visually rendering the received file via the browser and/or saving the received file in the local memory of the client. Upon completing the processing of the received response, the method loops back to operation 610.

At block 635, responsive to receiving an invalid session response from the server, the client generates a new cryptographic key pair including a private key and a public key. In some implementations, the client generates both in-memory and TPM-based cryptographic key pairs, and can use the TPM-generated private key to cryptographically sign the in-memory public key to be sent to the server. The client can further perform a user authentication procedure, as described in more detail herein above At operation 640, the processing logic generates the payload of a new request to be sent to a server. In an illustrative example, the payload of the new request can include the payload of the previously transmitted request which received the invalid session response, as described in more detail herein above.

At operation 645, the processing logic generates the request metadata. In an illustrative example, the request metadata can include an updated value of a session state variable and the new public keys (e.g., TPM-based public key and in-memory public key encrypted with the TMP-based public key), as described in more detail herein above.

At operation 650, the processing logic generates a cryptographic signature of the payload and the metadata. In an illustrative example, the cryptographic signature 308 can be represented by an encrypted value of a cryptographic digest generated by a chosen cryptographic digest transformation (e.g., ECDSA, SHA-256) of the payload of the request 306. The cryptographic digest value can be encrypted with a private key of the client 120A. In some implementations, an identifier of the chosen cryptographic digest computation protocol can be communicated to the server by a dedicated request header (e.g., the session information header 214C of FIG. 2), as described in more detail herein above.

Upon generating the cryptographic signature, the method loops back to operation 625.

Figure 7:
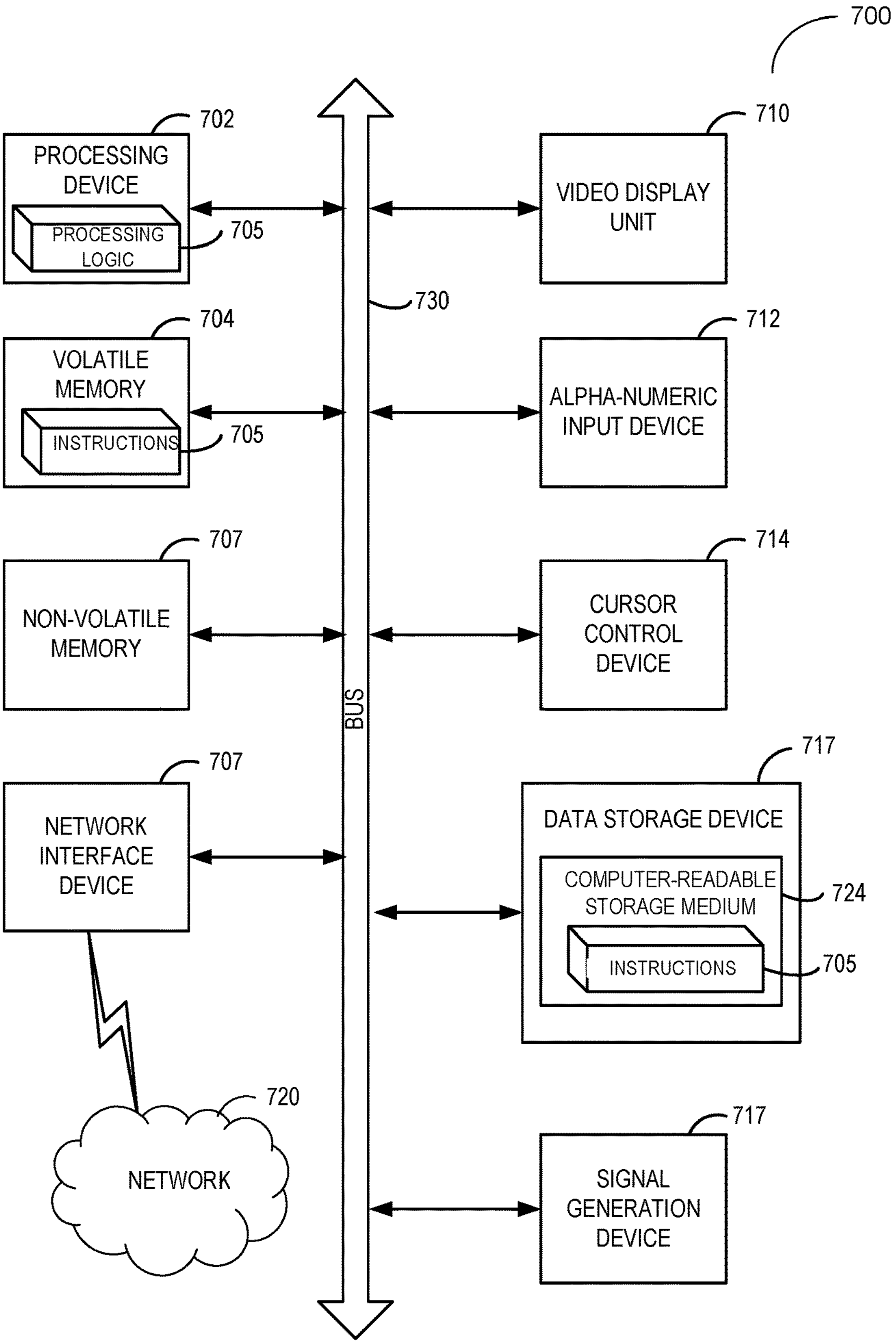
FIG. 7 is a block diagram illustrating an exemplary computer system, in accordance with implementations of the present disclosure.

FIG. 7 is a block diagram illustrating an exemplary computer system 700, in accordance with implementations of the present disclosure. The computer system 700 can correspond to the server 110 and/or client devices 102A-120K of FIG. 1. Computer system 700 can operate in the capacity of a server or an endpoint machine in an endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processing device (processor) 702, a main memory 704 (e.g., read-only memory (ROM), flash memory, dynamic random access memory (DRAM) such as synchronous DRAM (SDRAM), double data rate (DDR SDRAM), or DRAM (RDRAM), etc.), a static memory 707 (e.g., flash memory, static random access memory (SRAM), etc.), and a data storage device 717, which communicate with each other via a bus 730.

Processor (processing device) 702 represents one or more general-purpose processing devices such as a microprocessor, central processing unit, or the like. More particularly, the processor 702 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 can also be one or more special-purpose processing devices such as an application specific integrated circuit (ASIC), a field programmable gate array (FPGA), a digital signal processor (DSP), network processor, or the like. The processor 702 is configured to execute instructions 705 (e.g., implementing the session authentication engine 152) for performing the operations discussed herein.

The computer system 700 can further include a network interface device 707. The computer system 700 also can include a video display unit 710 (e.g., a liquid crystal display (LCD) or a cathode ray tube (CRT)), an input device 712 (e.g., a keyboard, and alphanumeric keyboard, a motion sensing input device, touch screen), a cursor control device 714 (e.g., a mouse), and a signal generation device 717 (e.g., a speaker).

The data storage device 717 can include a non-transitory machine-readable storage medium 724 (also computer-readable storage medium) on which is stored one or more sets of instructions 705 (e.g., implementing the session authentication engine 152) embodying any one or more of the methodologies or functions described herein. The instructions can also reside, completely or at least partially, within the main memory 704 and/or within the processor 702 during execution thereof by the computer system 700, the main memory 704 and the processor 702 also constituting machine-readable storage media. The instructions can further be transmitted or received over a network 720 via the network interface device 707.

In one implementation, the instructions 705 include instructions for providing fine-grained version histories of electronic documents at a platform. While the computer-readable storage medium 724 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "one implementation," "an implementation," or "an implementation," means that a particular feature, structure, or characteristic described in connection with the implementation and/or implementation is included in at least one implementation and/or implementation. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations. To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described can also interact with one or more other components not specifically described but known by those of skill in the art.

Moreover, the words "example" or "exemplary" are used to mean serving as an example, instance, or illustration. Any aspect or design described as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collected data is anonymized prior to performing any analysis to obtain any statistical patterns so that the identity of the user cannot be determined from the collected data.

What is claimed is:

1. A method, comprising:

receiving, by a server, a first request originated by a client, wherein the first request comprises a first payload and a first cryptographic signature of the first payload;

attempting to validate, using a stored public key associated with the client, the first cryptographic signature;

responsive to failing to validate the first cryptographic signature, transmitting, to the client, an invalid session response;

receiving, from the client, a second request comprising a second payload and a second cryptographic signature of the second payload, wherein the second payload comprises: (i) a new public key associated with the client and (ii) a cryptographic digest of an executable script executed by the client in order to apply a predefined transformation to a value of a session state variable;

validating, using the new public key, the second cryptographic signature; and responsive to validating the second cryptographic signature, establishing a new session associated with the client.

2. The method of claim 1, wherein the second cryptographic signature comprises at least one of: a third cryptographic signature determined using an in-memory private key of the client or a fourth cryptographic signature determined using a trusted platform module (TPM)-generated private key of the client.

3. The method of claim 1, further comprising:

responsive to establishing the new session associated with the client, forwarding the second payload and an identifier of the new session to a backend application.

4. The method of claim 3, further comprising:

transmitting, to the client, an application response comprising data received from the backend application.

5. The method of claim 1, wherein the second payload further comprises an updated value of the session state variable.

6. The method of claim 5, further comprising:

attempting to validate the updated value of the session state variable; and responsive to failing to validate the updated value of the session state variable, transmitting, to the client, a second invalid session response.

7. The method of claim 1, wherein the invalid session response comprises an executable script to be executed by the client.

8. The method of claim 1, wherein the invalid session response comprises at least one of: a session handshake header, a session signature header, a session metadata header, or a session information header.

9. A system comprising:

a memory; and a processing device coupled to the memory, the processing device to perform operations comprising:

receiving a first request originated by a client, wherein the first request comprises a first payload and a first cryptographic signature of the first payload;

attempting to validate, using a stored public key associated with the client, the first cryptographic signature;

responsive to failing to validate the first cryptographic signature, transmitting, to the client, an invalid session response;

receiving, from the client, a second request comprising a second payload and a second cryptographic signature of the second payload, wherein the second payload comprises: (i) a new public key associated with the client and (ii) a cryptographic digest of an executable script executed by the client in order to apply a predefined transformation to a value of a session state variable;

validating, using the new public key, the second cryptographic signature; and responsive to validating the second cryptographic signature, establishing a new session associated with the client.

10. The system of claim 9, wherein the second cryptographic signature comprises at least one of: a third cryptographic signature determined using an in-memory private key of the client or a fourth cryptographic signature determined using a trusted platform module (TPM)-generated private key of the client.

11. The system of claim 9, wherein the operations further comprise:

responsive to establishing the new session associated with the client, forwarding the second payload and an identifier of the new session to a backend application.

12. The system of claim 9, wherein the second payload further comprises an updated value of the session state variable.

13. The system of claim 9, wherein the invalid session response comprises an executable script to be executed by the client.

14. The system of claim 9, wherein the invalid session response comprises at least one of: a session handshake header, a session signature header, a session metadata header, or a session information header.

15. A non-transitory computer-readable storage medium comprising executable instructions that, when executed by a processing device, cause the processing device to perform operations comprising:

receiving a first request originated by a client, wherein the first request comprises a first payload and a first cryptographic signature of the first payload;

attempting to validate, using a stored public key associated with the client, the first cryptographic signature;

responsive to failing to validate the first cryptographic signature, transmitting, to the client, an invalid session response;

receiving, from the client, a second request comprising a second payload and a second cryptographic signature of the second payload, wherein the second payload comprises: (i) a new public key associated with the client and (ii) a cryptographic digest of an executable script executed by the client in order to apply a predefined transformation to a value of a session state variable;

validating, using the new public key, the second cryptographic signature; and responsive to validating the second cryptographic signature, establishing a new session associated with the client.

16. The non-transitory computer-readable storage medium of claim 15, wherein the second cryptographic signature comprises at least one of: a third cryptographic signature determined using an in-memory private key of the client or a fourth cryptographic signature determined using a trusted platform module (TPM)-generated private key of the client.

17. The non-transitory computer-readable storage medium of claim 15, wherein the operations further comprise:

responsive to establishing the new session associated with the client, forwarding the second payload and an identifier of the new session to a backend application.

18. The non-transitory computer-readable storage medium of claim 15, wherein the second payload further comprises an updated value of the session state variable.

19. The non-transitory computer-readable storage medium of claim 15, wherein the invalid session response comprises an executable script to be executed by the client.

20. The non-transitory computer-readable storage medium of claim 15, wherein the invalid session response comprises at least one of: a session handshake header, a session signature header, a session metadata header, or a session information header.

* * * * *